United States Patent
Bertini

(12) 
(10) Patent No.: US 6,394,521 B1
(45) Date of Patent: May 28, 2002

(54) GRIPPER WITH ENHANCED GRIPPING POWER ACCURACY AND REPEATABILITY

(76) Inventor: Millo Bertini, 679 Garden St., Trumbull, CT (US) 06611

( * ) Notice: Subject to any disclaimer, the term of this patent is extended or adjusted under 35 U.S.C. 154(b) by 0 days.

(21) Appl. No.: 09/522,740

(22) Filed: Mar. 10, 2000

(51) Int. Cl.[7] ................................................. B25J 15/08
(52) U.S. Cl. ........................ 294/88; 294/119.1; 901/37
(58) Field of Search .......................... 294/88, 93, 115, 294/116, 119.1; 269/30, 32, 34, 228; 279/4.1, 4.12, 110, 118, 119; 901/31, 36, 37, 39

(56) References Cited

U.S. PATENT DOCUMENTS

| | | | |
|---|---|---|---|
| 4,304,433 A | * 12/1981 | Langowski | ............. 294/115 X |
| 4,544,193 A | * 10/1985 | Dunn et al. | ........... 294/119.1 X |
| 4,593,948 A | 6/1986 | Borcea et al. | |
| 4,741,568 A | 5/1988 | Borcea et al. | |
| 4,874,194 A | 10/1989 | Borcea et al. | |
| 5,125,708 A | 6/1992 | Borcea et al. | |
| 5,163,729 A | 11/1992 | Borcea et al. | |
| 5,529,359 A | 6/1996 | Borcea et al. | |
| 5,572,915 A | 11/1996 | Bertini | |
| 5,967,581 A | 10/1999 | Bertini | |
| 6,003,431 A | 12/1999 | Bertini | |

FOREIGN PATENT DOCUMENTS

| | | | | |
|---|---|---|---|---|
| DE | 2263618 | * | 7/1974 | ............... 294/119.1 |
| DE | 3325921 | * | 1/1985 | ............... 294/119.1 |
| JP | 317989 | * | 12/1989 | ............... 294/119.1 |
| SU | 1034894 | * | 8/1983 | ............... 294/119.1 |

* cited by examiner

Primary Examiner—Johnny D. Cherry
(74) Attorney, Agent, or Firm—Fattibene & Fattibene; Paul A. Fattibene; Arthur T. Fattibene

(57) ABSTRACT

A gripper having a housing containing a piston and cylinder assembly and a pair of pinion gears rotatably journalled therein to oscillate in opposite directions. The housing is provided with a cruciform shaped guide way for accommodating a pair of finger carriers having a complementary cruciform shaped cross section slidably disposed within the guide way. A toggle arrangement including a cross-link connected to the piston and opposed connecting links interconnects the piston rod to the corresponding pinion gears so that, as the connecting links distend and extend upon the actuating of the piston, it results in reciprocation of the finger carriers to impart an enhanced closing force on the finger carriers in moving toward the closed position. Guide pins connected to the cross link and riding in slots on a cover plate enhance repeatability.

17 Claims, 3 Drawing Sheets

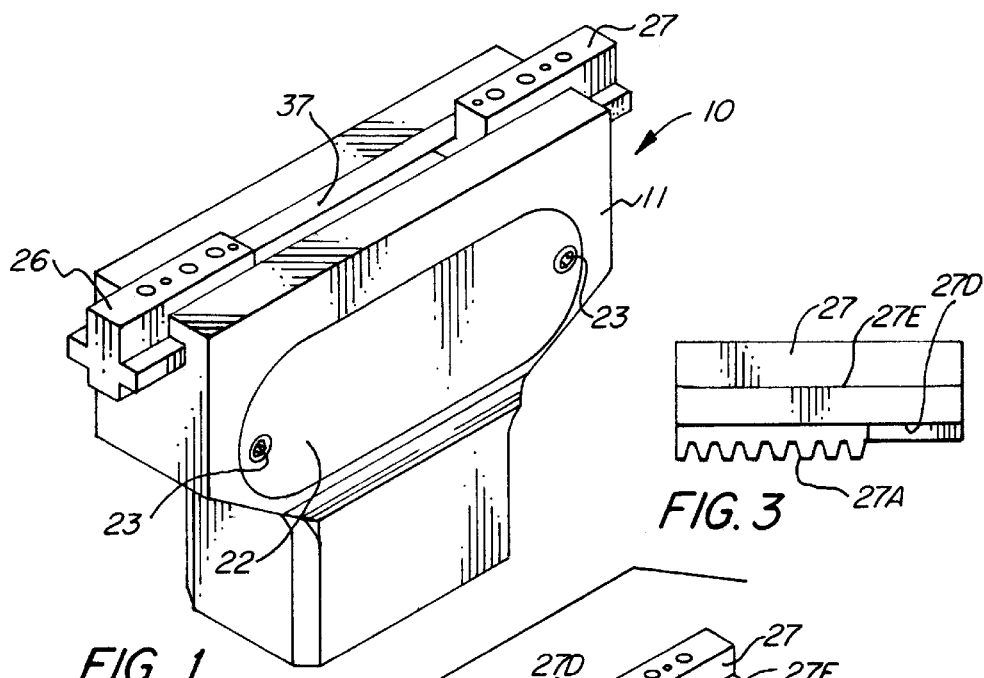
FIG. 1
FIG. 3
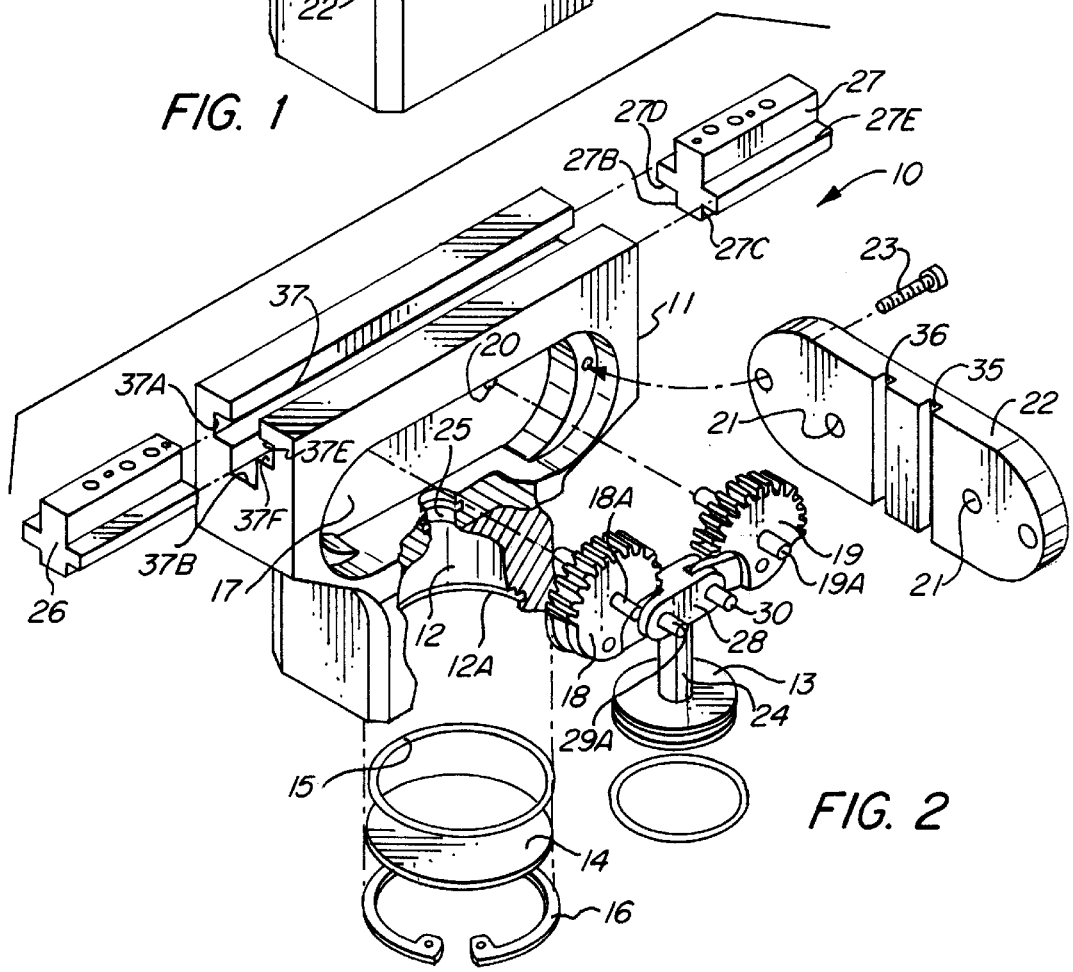
FIG. 2

GRIPPER WITH ENHANCED GRIPPING POWER ACCURACY AND REPEATABILITY

FIELD OF THE INVENTION

This invention relates generally to a gripper for use with robotic type tooling and more specifically to a parallel gripper having enhanced gripping power, accuracy and repeatability.

BACKGROUND OF THE INVENTION

Various types of grippers for use with-robotic type tooling or machines are known. Variations of the known grippers are disclosed in the following U.S. Pat. Nos. 4,593,948; 4,741,568; 4,874,194; 5,125,708; 5,163,729; 5,529,359; 5,572,915; 5,976,581 and 6,003,431. While the known grippers are operative for their intended purposes, efforts persist to obviate certain noted problems and/or to improve the operation thereof so as to enhance the accuracy and/or to provide for a more positive and/or enhanced gripping action while maintaining the parameters of the known grippers, i.e. in keeping within the physical limitations of the known grippers.

SUMMARY OF THE INVENTION

An object of this invention is to provide a gripper for use with robotic type tooling or machines capable of having an enhanced gripper force for positively retaining a workpiece.

Another object of this invention is to provide a gripper having means for enhancing repeatability of the movable finger carriers.

Another object of this invention is to provide a gripper with a relatively inexpensive and positive means for minimizing any play of the movable finger carriers to enhance the accuracy thereof.

The foregoing objects and other features and advantages, as will be apparent, are attained by a gripper having a housing provided with a piston or cylinder chamber having a piston reciprocally mounted therein, which is driven by means of a fluid medium imparting a fluid pressure on said piston to effect the reciprocation thereof. Connected to the piston is a piston rod having its free end operatively connected to a pair of pinion gears which are rotatably mounted within a gear chamber disposed adjacent. to the piston chamber. The arrangement is such that the piston rod extends through an opening formed in a partition or wall which separates the piston chamber from the gear chamber.

Journalled within the gear chamber are a pair of pinion gears which are operatively connected to the piston rod so as to oscillate in one direction or the other as the piston is displaced within the piston chamber in accordance with the direction in which the piston is being displaced by the pressure of the actuating fluid medium acting thereon. The connection between the piston rod and the pair of pinion gears is in the form of a toggle type linkage. The arrangement comprises a cross link fixed to the free end of the piston rod which extends into the gear recess. A connecting link pivotally connected to each end of the cross link is pivotally connected to the adjacent pinion gear so that when the piston rod is projected into the gear housing, the respective pinion gears are oppositely rotated in one direction and when the piston rod is shifted in the opposite direction, the pinion gears are oppositely rotated in the other or opposite direction.

Formed in the end of the housing is a cruciform transversely extending, guide way for accommodating a pair of finger carriers which are slidably mounted therein for reciprocal movement between an open and closed position. The respective finger carriers are provided with a rack disposed in meshing relationship with a corresponding pinion gear whereby the respective finger carriers are shifted between open and closed positions within the guide way in accordance to the direction of rotation of the pinion gears.

The cruciform guide way is formed so that the tolerance between the respective finger carriers and guide way are maintained to an absolute minimum on at least three contacting surfaces to minimize any play therebetween relative to the X, Y and Z axes thereof.

A cover plate having a pair of guide slots formed on the inner side thereof is provided to seal the gear housing. The cross link in turn is provided with a pair of guide pins arranged to be received in the respective guide slots of the cover plate so as to prohibit any flexing or deviation of the respective finger carriers so as to enhance the repeatability thereof.

IN THE DRAWINGS

FIG. 1 is a perspective view of a gripper embodying the invention.

FIG. 2 is a perspective exploded view of the gripper of FIG. 1 having parts shown in section.

FIG. 3 is a detail side view of a finger carrier component.

DETAILED DESCRIPTION

Figure 4:
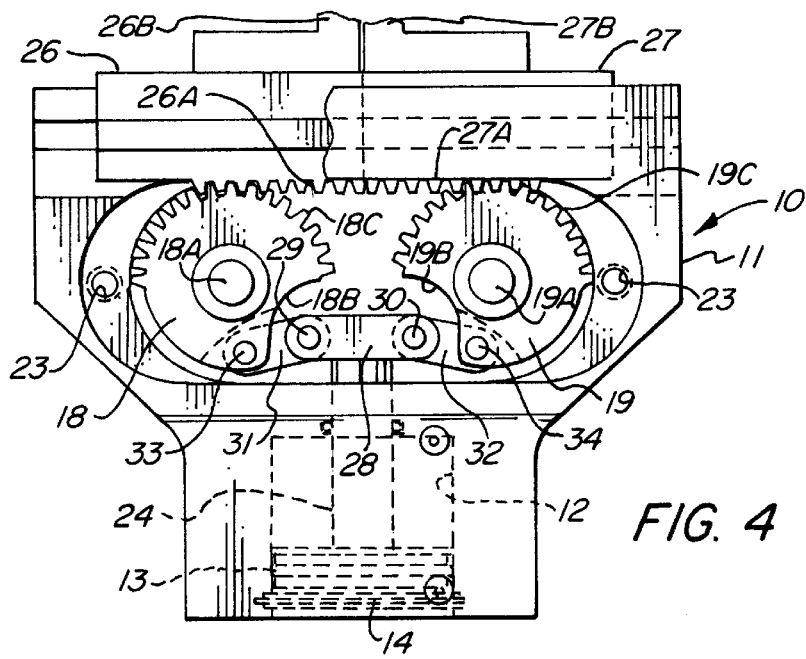
FIG. 4 is a side elevation view of the gripper of FIG. 1 illustrating the component parts in a finger carrier closed position.

Referring to the drawings, there is illustrated in FIG. 1 an embodiment of the invention. As shown, the gripper 10 includes a housing 11 having a piston or cylinder chamber 12 in which a displaceable piston 13 is slidably mounted. The outer end 12A of the piston or cylinder chamber 12 is closed or sealed by an end closure 14. A sealing ring 15 is disposed between the end 12A of the piston or cylinder chamber 12 and closure 14, and retainer ring 16 maintains the end closure 14 in sealing relationship relative to the cylinder chamber 12.

Figure 8:
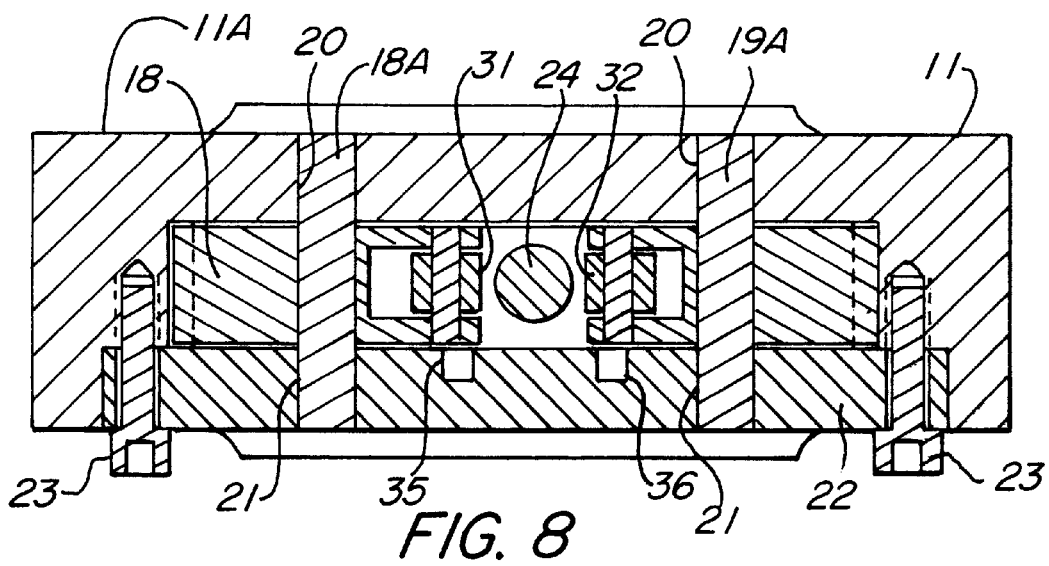
FIG. 8 is a sectional view taken along line 8—8 on FIG. 5.
Figure 7:
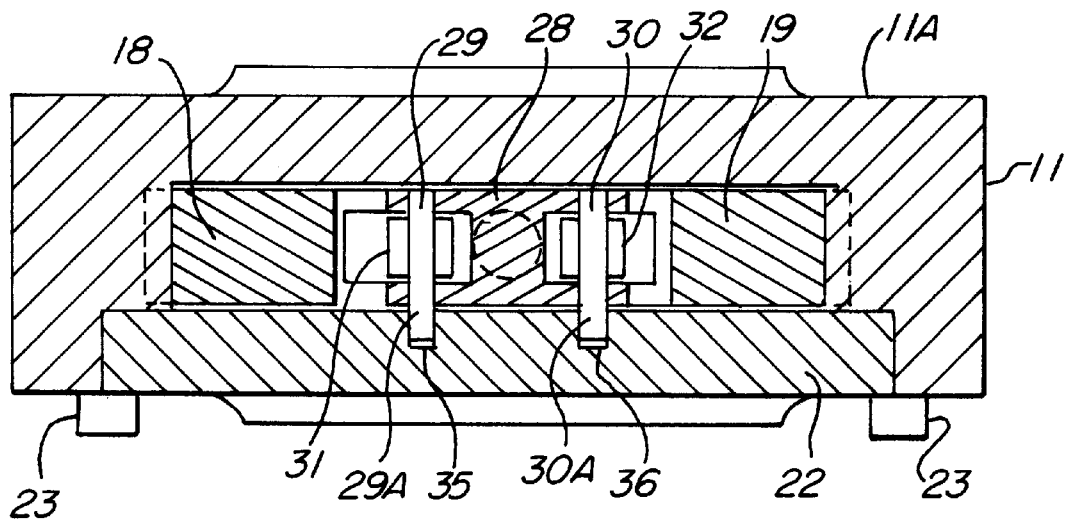
FIG. 7 is a sectional view taken along line 7—7 on FIG. 5.

In the illustrated embodiment, the housing 11 is also provided with a chamber or recessed portion 17 for accommodating a pair of pinion gears 18 and 19. The respective pinion gears 18 and 19 are rotatably journalled within the gear recess or chamber 17 about their respective axle pins 18A, 19A. As best seen in FIGS. 7 and 8, the opposed ends of the axle pins 18A, 19A are suitably journalled in corresponding spaced apart bearing holes 20 and 21 formed in the end wall 11A of the housing and an opposed end closure plate 22. The end closure plate 22 is detachably connected to the housing 11 by means of screw type fasteners or bolts 23.

In accordance with this invention, a piston rod 24 is connected to the piston 13 and has its free end extending through an opening 25 formed in the partition portion separating the cylinder chamber 12 from the pinion gear recess or chamber 17. Thus, the free end of the piston rod 24 extends into the pinion gear recess 17.

Figure 5:
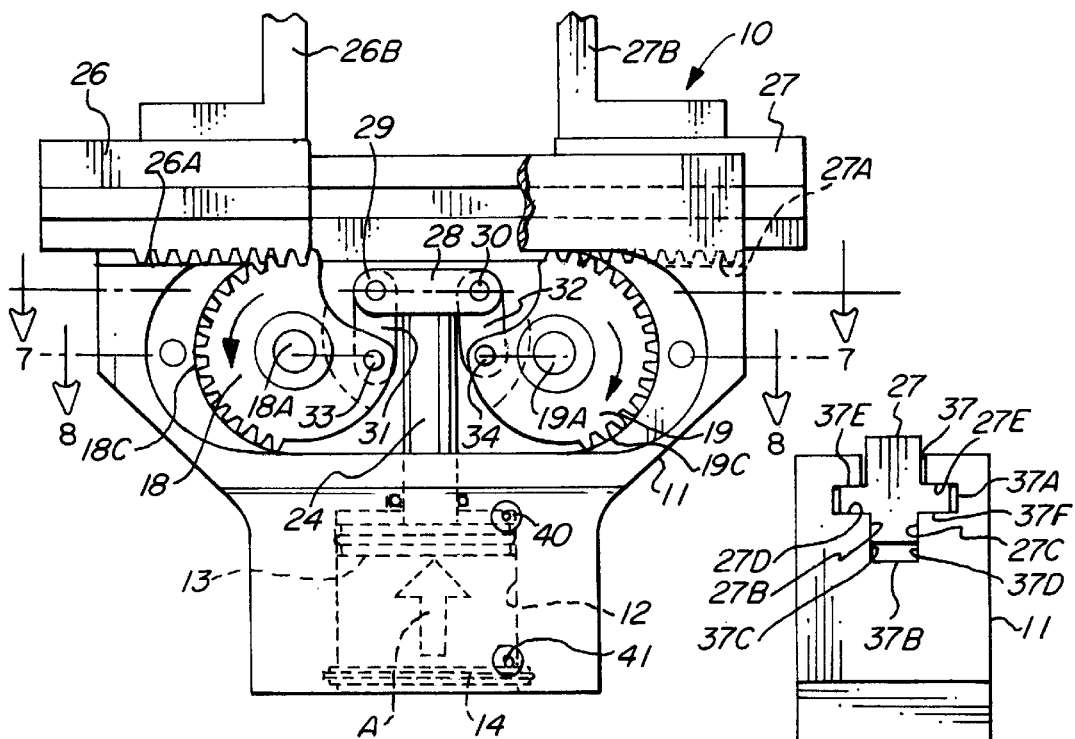
FIG. 5 is a side elevation view similar to FIG. 4 illustrating the component parts in a finger carrier open position.

As best seen in FIGS. 2, 4 and 5, the respective pinion gears 18, 19 are provided with a cutaway portion as indicated at 18B, 19B, respectively, which are oppositely disposed. A segmental portion of the pinion gears 18, 19 is provided with a series of circumferential teeth 18C and 19C respectively. As will be hereinafter described, the respective series of teeth 18C and 19C of pinion gears 18 and 19 are disposed in meshing relationship with the rack portion 26A, 27A of finger carriers 26 and 27 respectively. It will be understood that the respective finger carriers 26 and 27 are adapted to be fitted with suitable fingers 26B, 27B respectively to shift between open and closed positions for gripping a workpiece as will be hereinafter described.

In accordance with this invention, the free end of the piston rod 24 is operatively connected to the respective pinion gears 18 to 19 to effect the drive thereof as the piston 13 is displaced within the cylinder chamber by the action of an actuating fluid medium, e.g. compressed air or hydraulic fluid. In the illustrated embodiment, the connection comprises a toggle like means that includes a cross link 28 connected to the free end of piston rod 24. To each end of the cross link 28 there is pivotally connected about respective pivot pins 29 and 30, a connecting link 31 and 32. The other ends of connecting links 31 and 32 are pivotally connected to the pinion gears 18 and 19 by pivot pins 33 and 34 respectively. In the illustrated embodiment, it will be noted that the respective pinion gears 18 and 19 are provided with a bifurcated portion or recess for receiving the ends of the connecting links 31 and 32 which are journalled or pivotally connected by pivot pins 33, 34 respectively.

From the foregoing and as best noted in FIGS. 4 and 5, it will be apparent that as the piston 13 is displaced in the direction of the arrow A' as noted in FIG. 5, the piston rod 24 is projected into the pinion gear recess or chamber 17 to elevate the cross link 28, as viewed in FIG. 5, causing the respective connecting links 31 and 32 to effect counter-rotation of the respective pin gears in a direction to shift the respective finger carriers 26 and 27 in meshing relationship therewith to an open position as shown in FIG. 5. When the piston 13 is displaced in the opposite direction to withdraw the piston rod 24, as viewed in FIG. 4, the toggle connection described causes the respective pinion gears 18, 19 to counter-rotate in the opposite direction to shift the respective finger carriers 26, 27 to their closed position shown in FIG. 4. It is important that the throw or travel of the piston and connected piston rod for actuating the finger carriers toward the closed position, as seen in FIG. 4, is such that the cross link 28 and the respective connecting links extend only short of a dead center position of the toggle connection described, and do not go beyond or through the dead center position of the described toggle connection. Thus, maximum closing force is imparted to the closing fingers 26B, 27B without overstressing the same.

To insure repeatability of the movable finger carriers 26, 27 and the fingers 26B, 27B carried thereby, the cross link 28 is provided with a pair of projecting spaced apart guide pins 29A, 30A, which may be extensions of pivot pins 29, 30. As best seen in FIGS. 2 and 7, the end closure plate 22 on the inner surface thereof is provided with a pair of grooves 35, 36 to define a guide way for the projecting pins 29A, 30A, as best seen in FIG. 7. The guide pins 29A, 30A are in close tolerance with the grooves 35, 36 and in sliding relationship therewith so as to prohibit any undue play or flexing of the piston rod 24 so that the repeatability of the finger carriers is not adversely affected.

Figure 6:
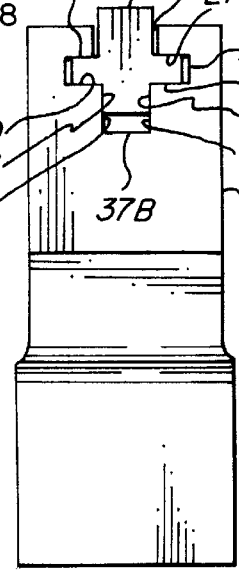
FIG. 6 is an end view of FIG. 1.

In accordance with this invention, the gripper housing 11 is provided with a cruciform guide way 37 in which the finger carriers 26 and 27 are slidably disposed for movement toward and away from one another. As best seen in FIGS. 1 and 2, the guide way 37 is in the shape of a cross having a lateral portion 37A and a vertical portion 37B. The respective finger carriers 26 and 27 are also cruciform in cross section that complement the cross section of the guide way 37. As best seen in FIG. 6, the vertical surfaces 37C and 37D of the lower end of the vertical portion 37 are machined to a very close tolerance to the complementary vertical surfaces of the finger carrier so as to provide for a minimum clearance tolerance therebetween. Likewise, the complementary upper and lower surfaces 37E, 37F of lateral portion 37A of the guide way 37 are machined to very close tolerances of the complementary lateral surfaces 27D and 27E of the finger carrier 27. Thus, as seen in FIG. 6, the complementary surfaces 37C, 37D; 37E, 37F are in close sliding relationship with the complementary surfaces 27B, 27C and 27D, 27E respectively of the corresponding finger carrier 27 so as to provide virtually zero tolerance therebetween. The arrangement is such that the respective finger carriers 26 and 27 are slidably mounted within the guide way 37 in a manner whereby any play therebetween is maintained to an absolute minimum or nil in the X, Y and Z axes thereof in a relatively simple and expedient manner. As a result, the accuracy and durability of the gripper can be maintained over a considerable period of use.

The cylinder chamber 12 of the gripper is provided with fluid inlet-outlet ports 40 and 41 to which the supply conduit (not shown) of a fluid activating medium is connected. As seen in FIG. 5, the ports 40 and 41 are in communication with the piston chamber 12 on opposite sides of the piston 13. It will be understood that the actuating fluid medium may be either a gas or liquid, e.g. compressed air or a hydraulic liquid.

In operation, when a fluid activating medium is introduced into port 41, e.g. compressed air, the piston 13 is displaced toward its upper position as viewed in FIG. 5. The displacement of the piston and connected piston rod 24 causes the pinion gears to be oppositely rotated to move the respective finger carriers 26, 27, in meshing relationship with the respective pinion gears 18 and 19, toward the open position. In doing so, the actuating fluid on the opposite side of the piston 13 is being exhausted through port 40.

When the flow of actuating medium is reversed, i.e. introduced into port 40, the operation is reversed. That is, the piston 13 is forced to its downward position as viewed in FIG. 4, causing the cross link 28 to be lower. In doing so, the connecting links 31 and 32 are caused to be extended to impart a large closing force on the finger carriers 26, 27, disposed in meshing relationship with the respective pinion gears 18, 19. The stroke of the piston rod 24 is such that the cross link merely approaches the dead center position of the toggle linkage, i.e. stops short of dead center and does not pass through the dead center position. The arrangement provides for a much greater closing force to be imparted to the respective gripping fingers 26B, 27B in the closed position to more positively grip a workpiece therebetween.

From the foregoing, it will be apparent that the described gripper is rugged in construction, yet rendered very accurate in operation and repeatability. The actuation of the respective pinion gears by means of a toggle like connection 28, 29 and 30, interposed between the piston rod 24 and the respective pinion gears 18, 19, imparts an enhanced closing force on the respective associated finger carriers 26, 27 to result in a greater and more positive gripping force being imparted to the gripping fingers 26B, 27B.

While the present invention has been described with respect to a particular embodiment, modifications and variations may be made without departing from the spirit or scope of this invention.

What is claimed is:

1. A gripper comprising:

a housing having a piston chamber and a connected gear chamber, a piston reciprocally mounted within said piston chamber, a piston rod connected to said piston and extending into said gear chamber, a pair of pinion gears disposed within said gear chamber, a toggle means having a dead center position connecting said piston rod to each of said pinion gears to effect the simultaneous actuation of said pinion gears when said piston is displaced within. said piston chamber, a guide way, formed on said housing, a pair of reciprocating finger carriers in meshing relationship with said pinion gears and slidably mounted in said guide way for movement between an open and closed position.

2. A gripper as defined in claim 1, wherein said toggle means comprises a cross link having opposed ends, said cross link connected to said piston rod, a pair of connecting links, each of said connecting links having one end pivotally connected to an opposed end of said cross link and said connecting link having its other end pivotally connected to a corresponding pinion gear, said connecting links being distended and extended as said piston is displaced within said piston chamber to effect the drive of said finger carriers between open and closed positions.

3. The gripper as defined in claim 2 wherein said connecting links are disposed in an extended position in the closed position of said finger carriers to impart an enhanced closing force on said finger carriers.

4. A gripper as defined in claim 3 wherein said piston and connected piston rod have a stroke that is insufficient to extend said toggle connection means through its dead center position in the closed position of said finger carriers.

5. A gripper comprising:

a housing having a piston chamber and a connected gear chamber, a piston reciprocally mounted within said piston chamber, a piston rod connected to said piston and extending into said gear chamber, a pair of pinion gears disposed within said gear chamber, a toggle means connecting said piston rod to each of said pinion gears to effect the simultaneous actuation of said pinion gears when said piston is displaced within said piston chamber, a guide way formed on said housing, a pair of reciprocating finger carriers in meshing relationship with said pinion gears and slidably mounted in said guide way for movement between an open and closed position, wherein said toggle means comprises a cross link having opposed ends connected to said piston rod, a pair of connecting links, each of said connecting links having one end pivotally connected to an opposed end of said cross link and said connecting link having its other end pivotally connected to a corresponding pinion gear, said connecting links being distended and extended as said piston is displaced within said piston chamber to effect the drive of said finger carriers between open and closed positions, wherein each of said pinion gears have a cut out portion, and said connecting links have said other ends pivotally connected to said pinion gear in the vicinity of said cut-out portion.

6. A gripper comprising:

a housing having a piston chamber and a connected gear chamber, a piston reciprocally mounted within said piston chamber, a piston rod connected to said piston and extending into said gear chamber, a pair of pinion gears disposed within said gear chamber, a toggle means connecting said piston rod to each of said pinion gears to effect the simultaneous actuation of said pinion gears when said piston is displaced within said piston chamber, a guide way formed on said housing, a pair of reciprocating finger carriers in meshing relationship with said pinion gears and slidably mounted in said guide way for movement between an open and closed position, wherein said toggle means comprises a cross link having opposed ends connected to said piston rod, a pair of connecting links, each of said connecting links having one end pivotally connected to an opposed end of said cross link and said connecting link having its other end pivotally connected to a corresponding pinion gear, said connecting links being distended and extended as said piston is displaced within said piston chamber to effect the drive of said finger carriers between open and closed positions, and including an end closure plate forming a cover for said gear chamber, and complementary means formed on said cross link and said closure plate for enhancing the repeatability of said finger carriers between open and closed positions.

7. A gripper as defined in claim 6 wherein said complementary means includes a pair of projecting guide pins connected to said cross link, and said end closure plate having a pair of grooves for complementing and receiving said projecting guide pins, wherein the working tolerance between said projecting guide pins and complementary groove is maintained at a minimum.

8. A gripper as defined in claim 1 wherein said guide way and finger carriers slidably mounted therein for movement between open and closed positions have complementary bearing surfaces so as to minimize any play in the X, Y and Z axes.

9. A gripper as defined in claim 1 wherein said guide way is cruciform in cross section, each of said finger carriers having a complementary cruciform cross-section whereby said cruciform shaped finger carriers are slidably disposed in said cruciform guide way for reciprocation between open and closed positions.

10. A gripper as defined in claim 1 wherein said guide way comprises a slot having a vertical portion and a lateral portion defining a cruciform slot, said finger carriers having a complementary vertical and lateral portion to define a cruciform shape arranged to be slidably received in said cruciform slot, whereby the complementary lateral portions of said finger carriers and said lateral portion of said slot are in close sliding relationship to minimize any vertical play therebetween, and the complementary vertical portions of said finger carriers and said vertical portion of said guide way are fitted in close sliding relationship to minimize any lateral play therebetween.

11. In a gripper having a housing, a piston chamber disposed within said housing, a piston displaceably disposed within said piston chamber, a piston rod connected to said piston, and a pair of finger carriers slidably disposed on said housing for movement between an open and closed position, the improvement of an actuating means for reciprocating said finger carriers between open and closed positions comprising:

a pair of pinion gears journalled in said housing to oscillate in opposite directions, said finger carriers each having a rack connected in meshing relationship with one of said pinion gears, and a toggle means connecting said piston rod to each of said pinion gears whereby said pinion gears are rotated in opposite directions as said piston and connected piston rod are displaced so that said finger carriers are translated between open and closed positions.

12. In a gripper having a housing, a piston chamber disposed within said housing, a piston displaceably disposed within said piston chamber, a piston rod connected to said piston, and a pair of finger carriers slidably disposed on said housing for movement between an open and closed position, the improvement of an actuating means for reciprocating said finger carriers between open and closed positions comprising:

a pair of pinion gears journalled in said housing to oscillate in opposite directions, said finger carriers each having a rack connected in meshing relationship with one of said pinion gears, and a toggle means connecting said piston rod to each of said pinion gears whereby said pinion gears are rotated in opposite directions as said piston and connected piston rod are displaced so that said finger carriers are translated between open and closed positions wherein said toggle means includes:

a cross link fixedly connected to said piston rod, each of said pinion gears has a cut-out sector, and a connecting link pivotally connected to one end of said cross-link and to a corresponding pinion gear in the vicinity of said cut-out sector.

13. A gripper as defined in claim 12 wherein said housing includes a recess for housing said pinion gears therein, a closure for said recess, and complementary means on said cross-link and closure interengaging to enhance the repeatability of said finger carriers.

14. A gripper as defined in claim 13 wherein said complementary means includes a pair of spaced projecting pins connected to said cross link, and said closure on the inner surface thereof having a pair of spaced apart grooves for receiving said projecting pins.

15. A gripper comprising:

a housing having a guide way extending transversely thereof, said guide way being cruciform in cross-section having a vertical groove and a transverse groove intersecting said vertical groove intermediate the height thereof, a pair of finger carriers having a complementary cruciform shape in cross-section, each of said finger carriers being slidably mounted to reciprocate toward and away from one another within said guide way, each of said finger carriers and guide way having complementary bearing surfaces disposed in relative sliding relationship to minimize any play therebetween in both a vertical and lateral direction, a pair of driving pinion gears journalled within said housing, each of said finger carriers being disposed in meshing relationship with a corresponding pinion gear, a piston and cylinder means disposed within said housing, and a toggle connection interconnecting said piston to each of said pinion gears to effect the drive thereof.

16. A gripper as defined in claim 15 including a piston rod connected to said piston, and said toggle connection including:

a cross link having opposed ends connected to said piston rod, a connecting link pivotally connected to each of said opposed ends, each of said connecting links having its other end pivotally connected to a corresponding pinion gear whereby the linear displacement of said piston is translated into reciprocal displacement of said finger carriers between open and closed positions through said toggle connection so that said connecting links are distended in the open position of said finger carriers and extended in the closed position of said finger carriers to impart an enhanced closing force on said finger carriers in the closed position.

17. A gripper comprising:

a housing having a guide way extending transversely thereof, said guide way being cruciform in cross-section having a vertical groove and a transverse groove intersecting said vertical groove intermediate the height thereof, a pair of finger carriers having a complementary cruciform shape in cross-section, each of said finger carriers being slidably mounted to reciprocate toward and away from one another within said guide way, each of said finger carriers and guide way having complementary bearing surfaces disposed in relative sliding relationship to minimize any play therebetween in both a vertical and lateral direction, a pair of driving pinion gears journalled within said housing, each of said finger carriers being disposed in meshing relationship with a corresponding pinion gear, a piston and cylinder means disposed within said housing, and a toggle connection interconnecting said piston to each of said pinion gears to effect the drive thereof, and including a piston rod connected to said piston, and said toggle connection including a cross link having opposed ends connected to said piston rod, a connecting link pivotally connected to each of said opposed ends, each of said connecting links having its other end pivotally connected to a corresponding pinion gear whereby the linear displacement of said piston is translated into reciprocal displacement of said finger carriers between open and closed positions through said toggle connection so that said connecting links are distended in the open position of said finger carriers and extended in the closed position of said finger carriers to impart an enhanced closing force on said finger carriers in the closed position, wherein said housing includes a recess, said pinion gears being journalled within said recess, a closure for said recess, said cross link having a pair of guide pins projecting laterally therefrom, and said closure on the inner surface thereof formed with a pair of grooves for receiving said guide pins.

* * * * *